US012784432B2

(12) United States Patent
Kim et al.

(10) Patent No.: US 12,784,432 B2
(45) Date of Patent: Nov. 3, 2026

(54) APPARATUS FOR CONTROLLING VEHICLE AND METHOD THEREOF

(71) Applicants: Hyundai Motor Company, Seoul (KR); Kia Corporation, Seoul (KR)

(72) Inventors: Jin Sol Kim, Hwaseong-si (KR); Woong Hyun Ka, Hwaseong-si (KR); Jang Yoon Kim, Hwaseong-si (KR); Jin Woo Bae, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 169 days.

(21) Appl. No.: 18/931,401

(22) Filed: Oct. 30, 2024

(65) Prior Publication Data

US 2025/0272967 A1 Aug. 28, 2025

(30) Foreign Application Priority Data

Feb. 28, 2024 (KR) ........................ 10-2024-0029182

(51) Int. Cl.
*G06V 10/82* (2022.01)
*G06T 5/70* (2024.01)
(Continued)

(52) U.S. Cl.
CPC ................ *G06V 10/82* (2022.01); *G06T 5/70* (2024.01); *G06T 7/521* (2017.01); *G06T 7/70* (2017.01);
(Continued)

(58) Field of Classification Search
CPC ...... G06V 10/82; G06V 10/26; G06V 10/764; G06V 10/774; G06V 20/58; G06V 10/803;
(Continued)

(56) References Cited

U.S. PATENT DOCUMENTS

2021/0012120 A1* 1/2021 Gummadi .......... B60W 60/0011
2022/0309693 A1 9/2022 Shaag
(Continued)

FOREIGN PATENT DOCUMENTS

CN 117115359 A 11/2023

OTHER PUBLICATIONS

Dhakal, S. et al., VirtualPainting: Addressing sparsity with virtual points and distance-aware data augmentation for 3D object detection, arXiv preprint arXiv 2312 16141 (2023). (Year: 2023).*
(Continued)

*Primary Examiner* — Devona E Faulk
*Assistant Examiner* — Donna J. Ricks
(74) *Attorney, Agent, or Firm* — Banner & Witcoff, Ltd.

(57) ABSTRACT

The present disclosure relates to a vehicle control apparatus and a method thereof. The vehicle control apparatus may include a memory in which neural network models are stored, a light detection and ranging (LiDAR) device, a camera, and a processor. The processor may obtain a first point cloud, generate a first sparse depth map based on the first point cloud, generate segmentation information by classifying a type of at least one pixel included in an image, generate a second point cloud by forming virtual points corresponding to a ground included in a blind spot of the LiDAR; generate a second sparse depth map and a third sparse depth map, generate a first dense depth map and a second dense depth map, train a second neural network model based on the second dense depth map, and control a vehicle based on the second dense depth map.

20 Claims, 7 Drawing Sheets

(51) Int. Cl.

| | |
|---|---|
| ***G06T 7/521*** | (2017.01) |
| ***G06T 7/70*** | (2017.01) |
| ***G06T 17/00*** | (2006.01) |
| ***G06V 10/26*** | (2022.01) |
| ***G06V 10/764*** | (2022.01) |
| ***G06V 10/774*** | (2022.01) |
| ***G06V 20/58*** | (2022.01) |

(52) U.S. Cl.
CPC .............. *G06T 17/00* (2013.01); *G06V 10/26* (2022.01); *G06V 10/764* (2022.01); *G06V 10/774* (2022.01); *G06V 20/58* (2022.01); *G06T 2207/10028* (2013.01); *G06T 2207/20081* (2013.01); *G06T 2207/20084* (2013.01); *G06T 2207/30244* (2013.01); *G06T 2207/30261* (2013.01); *G06T 2210/56* (2013.01)

(58) Field of Classification Search
CPC ...... G06V 20/56; G06V 10/25; G06V 10/806; G06V 10/12; G06V 10/30; G06T 5/70; G06T 7/521; G06T 7/70; G06T 17/00; G06T 2207/10028; G06T 2207/20081; G06T 2207/20084; G06T 2207/30244; G06T 2207/30261; G06T 2210/56; G06T 7/50; G06T 2207/30252; G01S 17/89; G01S 17/931; G01S 17/894; G06N 3/045; G06N 3/04; G06N 3/08; G06N 3/09; B60W 50/00; B60W 2050/0028; B60W 2420/403; B60W 2420/408; B60W 2754/10; B60W 40/02
See application file for complete search history.

(56) References Cited

U.S. PATENT DOCUMENTS

| | | | | |
|---|---|---|---|---|
| 2023/0305115 | A1 * | 9/2023 | Zhou | H03M 7/3068 |
| 2024/0362897 | A1 * | 10/2024 | Klinghoffer | G06T 7/55 |
| 2025/0028034 | A1 * | 1/2025 | Yan | G01S 7/497 |

OTHER PUBLICATIONS

Dhakal, S., Carillo, D., Qu, D., Nutt, M., Yang, Q., & Fu, S. (2023). VirtualPainting: Addressing sparsity with virtual points and distance-aware data augmentation for 3D object detection. arXiv preprint arXiv:2312.16141. https://arxiv.org/html/2312.16141v1.

Liang, M., Yang, B., Chen, Y., Hu, R., & Urtasun, R. (2019). Multi-task multi-sensor fusion for 3d object detection. Proceedings of the IEEE/CVF conference on computer vision and pattern recognition (pp. 7337-7345).

Shen, S. (2013). Accurate multiple view 3d reconstruction using patch-based stereo for large-scale scenes. IEEE transactions on image processing, 22(5), 1901-1914.

Mar. 11, 2025—(EP) Extended European Search Report—App 24209443.1.

* cited by examiner

APPARATUS FOR CONTROLLING VEHICLE AND METHOD THEREOF

CROSS-REFERENCE TO RELATED APPLICATION

This application claims the benefit of priority to Korean Patent Application No. 10-2024-0029182, filed in the Korean Intellectual Property Office on Feb. 28, 2024, the entire contents of which are incorporated herein by reference.

TECHNICAL FIELD

The present disclosure relates to a vehicle control apparatus and a method thereof, and more specifically, relates to a technology related to a neural network model.

BACKGROUND

In recent years, a research on a vehicle autonomous driving technology and/or a vehicle driving assistance technology has progressed, and a technology for identifying an external object by using a sensor (e.g., camera, LiDAR, and/or radar) included in a vehicle is actively researched.

In particular, due to the lack of a database (DB) for blind spots of a LiDAR, a neural network model is being trained by using a relatively unrealistic dataset. Accordingly, there is a need to improve the recognition performance of the neural network model by accounting for the blind spots of the LiDAR.

SUMMARY

The present disclosure was made to solve the above-mentioned problems occurring in at least some implementations while advantages achieved by those implementations are maintained intact.

An aspect of the present disclosure provides a vehicle control apparatus for improving training and/or inference of a neural network model (e.g., a monocular depth estimation (MDE) network), and a method thereof.

An aspect of the present disclosure provides a vehicle control apparatus for accurately predicting a distance between a vehicle and an external object by using an image obtained through a camera, by creating virtual points in blind spots of a LiDAR and training a neural network model by using a point cloud by the created virtual points, and a method thereof.

An aspect of the present disclosure provides a vehicle control apparatus for obtaining a dense depth map for effectively training the neural network model, and a method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, a vehicle control apparatus may include: a memory in which neural network models are stored; a light detection and ranging (LiDAR) device; a camera; and a processor. The processor may be configured to: obtain, via the LiDAR device, a first point cloud; generate, based on the first point cloud, a first sparse depth map; obtain, via the camera, an image; generate segmentation information by classifying a type of at least one pixel included in the image; generate a second point cloud by forming virtual points corresponding to a ground included in a blind spot of the LiDAR; generate, based on the second point cloud and the segmentation information, a second sparse depth map; generate, based on synthesizing the first sparse depth map and the second sparse depth map, a third sparse depth map; generate a first dense depth map based on inputting the third sparse depth map and the image into a first neural network model among the neural network models; generate a second dense depth map by removing at least one point from the first dense depth map, based on at least one of a confidence level, segmentation information, a noise, or a region of interest (ROI) of at least one point included in the first dense depth map; train, based on the second dense depth map, a second neural network model, which is different from the first neural network model, from among the neural network models; and control a vehicle based on the second dense depth map.

The processor may be configured to generate the first sparse depth map by: converting the first point cloud, which is expressed in a LiDAR device coordinate system based on a location of the LiDAR device, into points expressed in a camera coordinate system based on a location of the camera.

The processor may be configured to generate the second sparse depth map by: converting the second point cloud, which is expressed in a vehicle coordinate system for the vehicle, into points expressed in a camera coordinate system based on a location of the camera.

The processor may be configured to generate the second dense depth map by: determining the confidence level of at least one point included in the first dense depth map; and removing, from the first dense depth map, a point, of which the confidence level is less than a threshold value, from among points included in the first dense depth map.

The processor may be configured to generate the second dense depth map by: determining, in the first dense depth map, at least one pixel associated with a designated type among a plurality of types based on the segmentation information; and removing, from the first dense depth map, at least one point corresponding to the at least one pixel associated with the designated type.

The processor may be configured to generate the second dense depth map by: removing the noise from the first dense depth map; and selecting the ROI, from which the noise is removed, in the first dense depth map.

The blind spot may include an area, which the LiDAR device is incapable of rendering, in the ground. The processor may further be configured to: generate the virtual points associated with the area.

The processor may be configured to generate the third sparse depth map by: determining a plurality of first points included in the first sparse depth map; determining a plurality of second points included in the second sparse depth map; selecting at least part of the plurality of first points, which overlap at least part of the plurality of second points, as a first set; selecting a remaining part of the plurality of second points, which do not overlap the first set, as a second set; and generating the third sparse depth map further based on the first set and the second set.

The processor may be configured to train the second neural network model by: training the second neural network model further based on supervised learning using the second dense depth map as ground truth (GT).

The first neural network model may use, as inputs, the image and the third sparse depth map. The second neural network model may output, using the image as an input, a depth map indicating a distance between objects, included in the image, and the vehicle.

According to one or more example embodiments of the present disclosure, a method may include: generating, by a processor, a first sparse depth map based on a first point cloud obtained through a LiDAR device; generating segmentation information by classifying a type of at least one pixel included in an image obtained via a camera; generating a second point cloud by forming virtual points corresponding to a ground included in a blind spot of the LiDAR device; generating, based on the second point cloud and the segmentation information, a second sparse depth map; generating, based on synthesizing the first sparse depth map and the second sparse depth map, a third sparse depth map; generating a first dense depth map based on inputting the third sparse depth map and the image into a first neural network model among neural network models; generating a second dense depth map by removing at least one point from the first dense depth map, based on at least one of a confidence level, segmentation information, a noise, or a region of interest (ROI) of at least one point included in the first dense depth map; training, based on the second dense depth map, a second neural network model, which is different from the first neural network model, from among the neural network models; and controlling a vehicle based on the second dense depth map.

The method may further include: converting the first point cloud, which is expressed in a LiDAR device coordinate system based on a location of the LiDAR device, into points expressed in a camera coordinate system based on a location of the camera.

The method may further include: converting the second point cloud, which is expressed in a vehicle coordinate system for the vehicle, into points expressed in a camera coordinate system based on a location of the camera.

The method may further include: determining the confidence level of at least one point included in the first dense depth map; and removing, from the first dense depth map, a point, of which the confidence level is less than a threshold value, from among points included in the first dense depth map.

The method may further include: determining, in the first dense depth map, at least one pixel associated with a designated type among a plurality of types based on the segmentation information; and removing, from the first dense depth map, at least one point corresponding to the at least one pixel associated with the designated type.

The method may further include: removing the noise from the first dense depth map; and selecting the ROI, from which the noise is removed, in the first dense depth map.

The blind spot may include an area, which the LiDAR device is incapable of rendering, in the ground. The method may further include: generating the virtual points associated with the area.

The method may further include: determining a plurality of first points included in the first sparse depth map; determining a plurality of second points included in the second sparse depth map; selecting at least part of the plurality of first points, which overlap at least part of the plurality of second points, as a first set; and selecting a remaining part of the plurality of second points, which do not overlap the first set, as a second set. Generating the third sparse depth map may be further based on the first set and the second set.

Training the second neural network model may be further based on supervised learning using the second dense depth map as GT.

The first neural network model may use, as inputs, the image and the third sparse depth map. The second neural network model may output, using the image as an input, a depth map indicating a distance between objects, included in the image, and the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
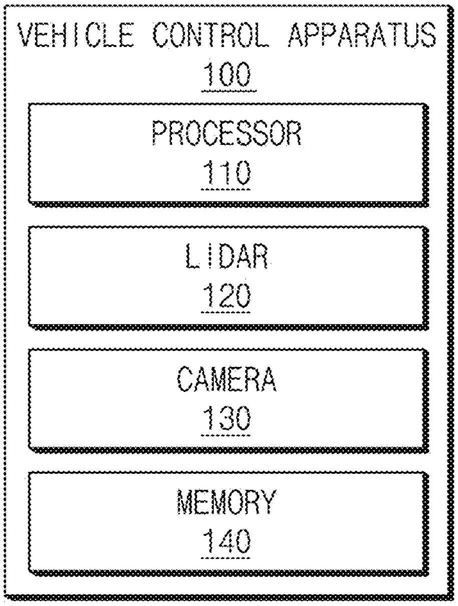
FIG. 1 shows an example of a block diagram associated with a vehicle control apparatus, according to an embodiment of the present disclosure.

Hereinafter, some embodiments of the present disclosure will be described in detail with reference to the accompanying drawings. In adding reference numerals to components of each drawing, it should be noted that the same components include the same reference numerals, although they are indicated on another drawing. Furthermore, in describing the embodiments of the present disclosure, detailed descriptions associated with well-known functions or configurations will be omitted if they may make subject matters of the present disclosure unnecessarily obscure.

In describing elements of an embodiment of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as including a meaning that is consistent with their meaning in the context of the present disclosure and the relevant art and will not be interpreted in an idealized or overly formal sense unless expressly so defined herein.

Hereinafter, embodiments of the present disclosure will be described in detail with reference to FIGS. 1 to 7.

FIG. 1 shows an example of a block diagram associated with a vehicle control apparatus, according to an embodiment of the present disclosure.

Referring to FIG. 1, a vehicle control apparatus 100 according to an embodiment of the present disclosure may be implemented inside or outside a vehicle, and some of components included in the vehicle control apparatus 100 may be implemented inside or outside the vehicle. At this time, the vehicle control apparatus 100 may be integrated with internal control units of a vehicle and may be implemented with a separate device so as to be coupled with control units of the vehicle by means of a separate connection means. For example, the vehicle control apparatus 100 may further include components not shown in FIG. 1.

Referring to FIG. 1, a vehicle control apparatus 100 according to an embodiment may include a processor 110, a LiDAR 120, a camera 130, and a memory 140. The processor 110, the LiDAR 120, the camera 130, or the memory 140 may be electrically and/or operably coupled with each other by an electronic component including a communication bus.

Hereinafter, the fact that pieces of hardware are coupled operably may include the fact that a direct and/or indirect connection between the pieces of hardware is established by wired and/or wirelessly such that second hardware is controlled by first hardware among the pieces of hardware.

Although different blocks are shown, an embodiment is not limited thereto. For example, some of the pieces of hardware in FIG. 1 may be included in a single integrated circuit including a system on a chip (SoC). The type and/or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 according to an embodiment may include hardware for processing data based on one or more instructions. The hardware for processing data may include the processor 110. For example, the hardware for processing data may include an arithmetic and logic unit (ALU), a floating point unit (FPU), a field programmable gate array (FPGA), a central processing unit (CPU), and/or an application processor (AP).

For example, the processor 110 may include a structure of a single-core processor, or may include a structure of a multi-core processor including a dual core, a quad core, a hexa core, or an octa core.

The LiDAR 120 of the vehicle control apparatus 100 according to an embodiment may obtain data sets obtained by identifying objects surrounding the vehicle control apparatus 100 (or a vehicle including the vehicle control apparatus 100). For example, the LiDAR 120 may identify at least one of a location of the surrounding object, a movement direction of the surrounding object, or speed of the surrounding object, or any combination thereof based on a pulse laser signal emitted from the LiDAR 120 being reflected by the surrounding object and returned.

For example, the LiDAR 120 may obtain data sets for expressing an external object in the space defined by an x-axis, a y-axis, and a z-axis based on a pulse laser signal reflected from surrounding objects. For example, the LiDAR 120 may obtain data sets including a plurality of points in the space, which is formed by the x-axis, the y-axis, and the z-axis, based on receiving the pulse laser signal at a specified period.

The processor 110 included in the vehicle control apparatus 100 according to an embodiment may emit light from a vehicle by using the LiDAR 120. For example, the processor 110 may receive light emitted from the vehicle. For example, the processor 110 may identify at least one of a location, a speed, or a moving direction, or any combination thereof of a surrounding object based on a time required to transmit light emitted from the vehicle and a time required to receive light emitted from the vehicle.

For example, the processor 110 may obtain data sets including a plurality of points based on the time required to transmit light emitted from the vehicle and the time required to receive light emitted from the vehicle. The processor 110 may obtain data sets for expressing a plurality of points in a three-dimensional virtual coordinate system including the first axis, the second axis, and the third axis.

The camera 130 included in the vehicle control apparatus 100 according to an embodiment may include one or more optical sensors (e.g., a charged coupled device (CCD) sensor or a complementary metal oxide semiconductor (CMOS) sensor) that generate electrical signals indicating the color and/or brightness of light.

For example, a plurality of optical sensors included in the camera 130 may be arranged in a form of a 2-dimensional array. The camera 130 may obtain electrical signals from a plurality of optical sensors substantially simultaneously and may generate images or frames, each of which corresponds to light reaching optical sensors in two-dimensional grids and each of which includes a plurality of pixels arranged in two dimensions.

For example, photo data captured by using the camera 130 may refer to a plurality of images obtained from the camera 130.

For example, video data captured by using the camera 130 may mean the sequence of a plurality of images obtained from the camera 130 at a designated frame rate.

The memory 140 of the vehicle control apparatus 100 according to an embodiment may include a hardware component for storing data and/or instructions that are to be input and/or output to the processor 110 of the vehicle control apparatus 100.

For example, the memory 140 may include at least one of a volatile memory including a random-access memory (RAM), or a non-volatile memory including a read-only memory (ROM), or any combination thereof.

For example, the volatile memory may include at least one of a dynamic RAM (DRAM), a static RAM (SRAM), a cache RAM, or a pseudo SRAM (PSRAM), or any combination thereof.

For example, the non-volatile memory includes at least one of a programmable ROM (PROM), an erasable PROM (EPROM), an electrically erasable PROM (EEPROM), a flash memory, a hard disk, a compact disk, a solid state drive (SSD), or an embedded multi-media card (eMMC), or any combination thereof. For example, neural network models may be stored in the memory 140. For example, a first neural network model among the neural network models may include a model for obtaining a dense depth map. For example, a second neural network model among neural network models may include a model for estimating a distance between an external object and a vehicle including the camera 130 based on an image obtained through the camera 130. A depth map may be an image (or image channel) that includes information relating to the distance of surfaces of one or more objects from a viewpoint. A depth map may be rendered by obtaining a plurality of images from one or more viewpoints and determining a distance from one or more pixel to one or more image sensors (e.g., cameras).

For example, the first neural network model may use the image and a sparse depth map as inputs. For example, the second neural network model may output a depth map indicating the distance between objects displayed in the image and the vehicle including the camera 130, by using the image as an input.

In the present disclosure, it is expressed as a neural network model, but an embodiment is not limited thereto. For example, the neural network model may include at least one of a multilayer perceptron (MLP), a convolution neural network (CNN), a recurrent neural network (RNN), or a transformer, or any combination thereof. Moreover, the neural network model of the present disclosure may include a deep-learning-based MDE model.

The processor 110 of the vehicle control apparatus 100 according to an embodiment may obtain a first point cloud through the LiDAR 120. For example, the processor 110 may obtain the first sparse depth map based on obtaining the first point cloud through the LiDAR 120.

In an embodiment, the processor 110 may identify a LiDAR coordinate system based on the location of the LiDAR 120. The processor 110 may convert the first point cloud, which is expressed in the LiDAR coordinate system based on the location of the LiDAR 120, into points expressed in a camera coordinate system based on the location of the camera 130.

For example, the processor 110 may obtain a first sparse depth map based on converting the first point cloud, which is expressed in the LiDAR coordinate system based on the location of the LiDAR 120, into points expressed in the camera coordinate system based on the location of the camera 130.

For example, the LiDAR coordinate system may include a coordinate system expressed around the optical axis of the LiDAR 120. For example, the camera coordinate system may include a coordinate system expressed around the optical axis of the camera 130.

For example, the first point cloud may be obtained based on a plurality of points obtained through the LiDAR 120.

In an embodiment, the processor 110 may obtain an image through the camera 130. For example, the processor 110 may obtain segmentation information obtained by analyzing the type of each of pixels, which are included in the image, based on obtaining the image through the camera 130. For example, the segmentation information may be generated to correspond to each of the pixels. For example, the segmentation information may include information obtained by classifying the type of each of the pixels.

For example, the type of each of the pixels may include at least one of a ground, sky, or an external object different from the ground, or any combination thereof. For example, the external object different from the ground may include at least one of a commercial vehicle, a passenger vehicle, a pedestrian, a building, a traffic light, or a sign, or any combination thereof. However, an embodiment of the present disclosure is not limited to the above description.

In an embodiment, the processor 110 may generate virtual points corresponding to the ground included in the blind spot of the LiDAR 120. For example, the blind spot may include an area of the ground incapable of being expressed by the LiDAR 120. For example, the processor 110 may generate a second point cloud based on creating virtual points with respect to areas of the ground incapable of being expressed by the LiDAR 120.

For example, the processor 110 may project at least one of the virtual points, or the second point cloud, or any combination thereof onto the image.

For example, the processor 110 may generate the second point cloud formed by the virtual points corresponding to the ground included in the blind spot. The processor 110 may obtain a second sparse depth map based on the second point cloud and the segmentation information.

For example, the processor 110 may obtain a second sparse depth map by using the second point cloud and the segmentation information based on generating the second point cloud formed by the virtual points corresponding to the ground included in the blind spot.

In an embodiment, the processor 110 may obtain a second point cloud based on a vehicle coordinate system formed based on a vehicle. The processor 110 may obtain the second sparse depth map based on converting the second point cloud based on the vehicle coordinate system formed based on the vehicle into points expressed in the camera coordinate system based on the location of the camera 130.

For example, the vehicle coordinate system may include a coordinate system expressed based on the center of a front bumper of the vehicle. For example, the vehicle coordinate system may include a coordinate system in which the center of the front bumper of the vehicle is set as the origin, the vertical axis of the vehicle is set as the x-axis, and the horizontal axis of the vehicle is set as the y-axis.

In an embodiment, the processor 110 may synthesize a first sparse depth map and a second sparse depth map. For example, the processor 110 may obtain a third sparse depth map based on synthesizing the first sparse depth map and the second sparse depth map.

In an embodiment, the processor 110 may identify a plurality of first points included in the first sparse depth map. The processor 110 may identify a plurality of second points included in the second sparse depth map.

For example, the processor 110 may select at least part of the plurality of first points, which overlap at least part of the plurality of second points, from among the plurality of first points as a first set. The processor 110 may select the plurality of second points, which do not overlap the plurality of first points, as a second set.

For example, the processor 110 may obtain a third sparse depth map based on the first set and the second set. For example, the processor 110 may obtain the third sparse depth map including both the first set and the second set. For example, the processor 110 may obtain the third sparse depth map including both the plurality of first points and the plurality of second points.

In an embodiment, the processor 110 may input the third sparse depth map and the image into the first neural network model among the neural network models. For example, the processor 110 may obtain a first dense depth map based on inputting the third sparse depth map and the image into the first neural network model among the neural network models.

In an embodiment, the processor 110 may identify at least one of confidence, segmentation information, noise, or region of interest (ROI), or any combination thereof for each point included in the first dense depth map. For example, the processor 110 may obtain a second dense depth map, in which at least one point is removed from the first dense depth map, based on at least one of the confidence, the segmentation information, noise, or the ROI, or any combination thereof of each of the points included in the first dense depth map.

In an embodiment, the processor 110 may identify the confidence of each of points included in the first dense depth map. For example, the processor 110 may remove points, the confidence of each of which is less than reference confidence, from among points included in the first dense depth map from the first dense depth map. For example, the processor 110 may obtain the second dense depth map based on removing points, the confidence of each of which is less than the reference confidence, from among the points included in the first dense depth map from the first dense depth map.

In an embodiment, in the first dense depth map, the processor 110 may identify at least one pixel with a designated type among a plurality of types based on the segmentation information. For example, the processor 110 may identify at least one point corresponding to at least one pixel with the designated type. The processor 110 may remove at least one point corresponding to at least one pixel with the designated type from the first dense depth map. The processor 110 may obtain the second dense depth map based on removing at least one point corresponding to at least one pixel with the designated type from the first dense depth map.

In an embodiment, the processor 110 may remove noise from the first dense depth map. For example, the processor 110 may select an ROI from the first dense depth map from which noise is removed. The processor 110 may obtain the second dense depth map based on selecting the ROI from the first dense depth map from which the noise is removed.

For example, the processor 110 may select the ROI based on sequentially removing a point, of which the confidence is less than the reference confidence, a point corresponding to the designated type, and the noise. The processor 110 may obtain a second dense depth map by selecting the ROI based on sequentially removing a point of which the confidence is less than the reference confidence, a point corresponding to the designated type, and the noise.

For example, the second dense depth map may include a depth map in which depth is formed for each of the pixels. For example, the depth in a sparse depth map may be formed in some of the pixels, but the depth in a dense depth map may be formed in all pixels.

In an embodiment, the processor 110 may train the second neural network model different from the first neural network model among the neural network models.

In an embodiment, the processor 110 may use the second dense depth map as ground truth (GT). For example, the processor 110 may perform supervised learning by using the second dense depth map as GT. For example, the processor 110 may train the second neural network model based on the supervised learning that uses the second dense depth map as GT.

In an embodiment, the processor 110 may output depth information indicating a distance between the vehicle including the camera 130 and an external object based on inputting the image obtained through the camera 130 into the trained second neural network model. The processor 110 may assist the driving of the vehicle based on depth information indicating the distance between the vehicle and the external object. The processor 110 may perform autonomous driving of the vehicle based on the depth information indicating the distance between the vehicle and the external object.

As mentioned above, the processor 110 of the vehicle control apparatus 100 according to an embodiment may train the second neural network model based on the second dense depth map. The processor 110 of the vehicle control apparatus 100 may relatively accurately identify a distance if identifying the distance between the vehicle and the external object by using an image, by training the second neural network model based on the second dense depth map.

Figure 2:
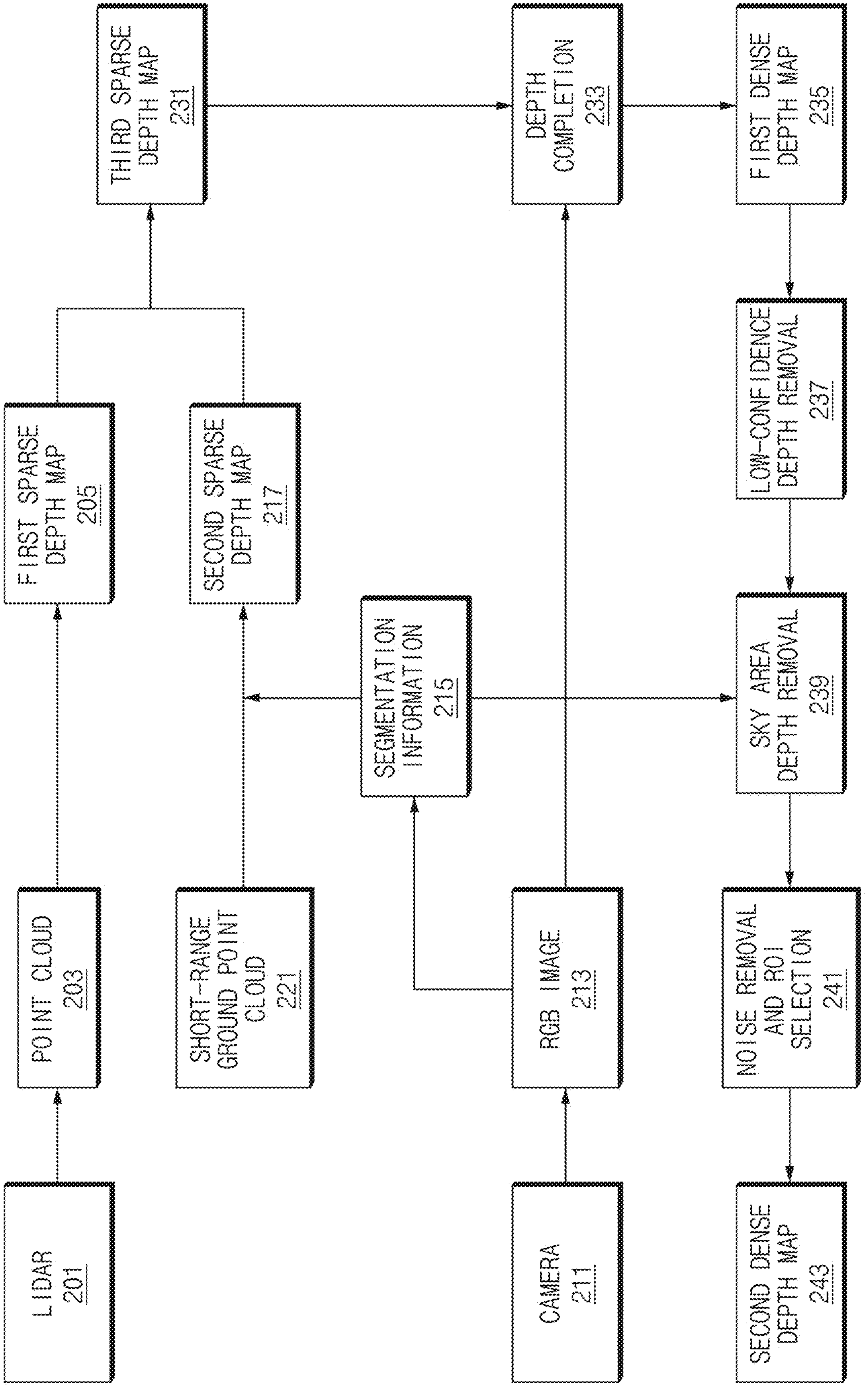
FIG. 2 shows an example, in which a vehicle control apparatus obtains a dense depth map for training a neural network model, according to an embodiment of the present disclosure.

FIG. 2 shows an example, in which a vehicle control apparatus obtains a dense depth map for training a neural network model, according to an embodiment of the present disclosure.

Referring to FIG. 2, a vehicle control apparatus (e.g., the vehicle control apparatus 100 of FIG. 1) according to an embodiment may include a LiDAR 201 (e.g., the LiDAR 120 of FIG. 1), and/or a camera 211 (e.g., the camera 130 of FIG. 1).

A processor (e.g., the processor 110 in FIG. 1) of the vehicle control apparatus according to an embodiment may obtain a point cloud 203 through the LiDAR 201. For example, the processor may obtain a first sparse depth map 205 based on the point cloud 203.

In an embodiment, the processor may generate a short-range ground point cloud 221. For example, the short-range ground point cloud 221 may be obtained based on virtual points generated by the processor. For example, the short-range ground point cloud 221 may include virtual points corresponding to the ground included in blind spots.

In an embodiment, the processor may obtain a red green blue (RGB) image 213 through the camera 211. For example, the processor may obtain segmentation information 215 from the RGB image 213. For example, the processor may obtain the segmentation information 215 corresponding to each of pixels included in the RGB image 213. For example, the processor may obtain the segmentation information 215 indicating the type of each of the pixels included in the RGB image 213.

In an embodiment, the processor may obtain a second sparse depth map 217 based on the segmentation information 215 and the short-range ground point cloud 221.

In an embodiment, the processor may obtain a third sparse depth map 231 based on the first sparse depth map 205 and the second sparse depth map 217. For example, the processor may obtain the third sparse depth map 231 based on synthesizing the first sparse depth map 205 and the second sparse depth map 217.

For example, an operation of synthesizing the first sparse depth map 205 and the second sparse depth map 217 may include an operation of obtaining a sparse depth map using both a plurality of first points included in the first sparse depth map 205 and a plurality of second points included in the second sparse depth map 217. For example, the sparse depth map using both the plurality of first points included in the first sparse depth map 205 and the plurality of second points included in the second sparse depth map 217 may include a third sparse depth map.

In an embodiment, the processor may perform depth completion 233 based on the RGB image 213 and the third sparse depth map 231. For example, the processor may perform the depth completion 233 based on inputting the RGB image 213 and the third sparse depth map 231 into a first neural network model among neural network models stored in a memory (e.g., the memory 140 in FIG. 1).

In an embodiment, the processor may obtain a first dense depth map 235 based on performing the depth completion 233 by using the RGB image 213 and the third sparse depth map 231.

In an embodiment, the processor may identify the confidence (e.g., a confidence level) of each of points included in the first dense depth map 235. The processor may perform low-confidence depth removal 237 based on identifying the confidence of each of points included in the first dense depth map 235. For example, the low-confidence depth removal 237 may include a process of removing a point of which the confidence is less than reference confidence.

In an embodiment, the processor may perform sky area depth removal 239 based on performing the low-confidence depth removal 237. For example, the processor may identify the type of each of points based on the segmentation information 215. For example, the processor may determine whether the type of each of points included in the first dense depth map 235 is a designated type, based on the segmentation information 215. For example, the processor may remove at least one point, which is identified as the designated type, based on the fact that at least part of points, from which at least some of the points are removed by the low-confidence depth removal 237 and which are included in the first dense depth map 235, is a designated type. For example, the designated type may include sky.

In an embodiment, the processor may perform noise removal and ROI selection 241. For example, the processor may perform the noise removal and ROI selection 241 based on removing a point, of which confidence is less than the reference confidence, and removing a point identified as the designated type. For example, the ROI may include an area capable of being provided to a user through a display of a vehicle including the vehicle control apparatus.

In an embodiment, the processor may obtain a second dense depth map 243 based on performing the noise removal and ROI selection 241.

As mentioned above, the processor of the vehicle control apparatus according to an embodiment may train a second neural network model different from the first neural network model described above, based on the obtained second dense depth map 243. The processor may relatively accurately identify a distance between an external object and a vehicle if identifying the distance between the external object and the vehicle based on an image, by training the second neural network model based on the second dense depth map 243.

Figure 3:
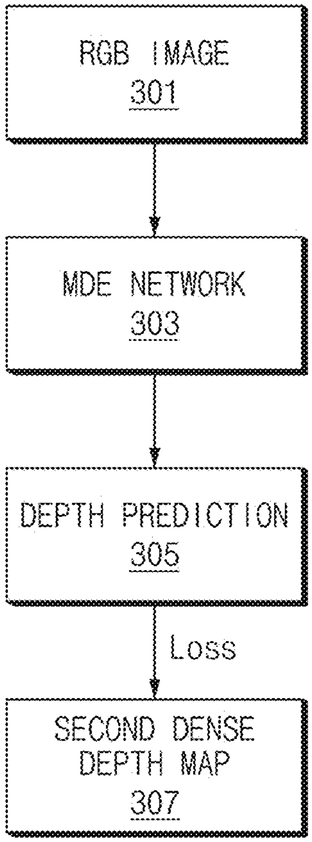
FIG. 3 shows an example, in which a vehicle control apparatus trains a neural network model, according to an embodiment of the present disclosure.

FIG. 3 shows an example, in which a vehicle control apparatus trains a neural network model, according to an embodiment of the present disclosure.

Referring to FIG. 3, a processor (e.g., the processor 110 of FIG. 1) of a vehicle control apparatus (e.g., the vehicle control apparatus 100 of FIG. 1) according to an embodiment may obtain an RGB image 301 through a camera (e.g., the camera 130 in FIG. 1).

In an embodiment, the processor may input an RGB image 301 to a MDE network 303. For example, the MDE network 303 may include a neural network model for identifying a distance between an external object and a host vehicle.

For example, the processor may perform depth prediction 305 based on inputting the RGB image 301 into the MDE network 303. For example, the depth prediction 305 may include a process of predicting the distance between a vehicle including the camera and the external object.

In an embodiment, the processor may obtain a depth map by performing the depth prediction 305 based on inputting the RGB image 301 into the MDE network 303. For example, the processor may obtain a depth map for expressing a three-dimensional space by inputting the RGB image 301 expressed in two dimensions into the MDE network 303.

In an embodiment, the processor may obtain a second dense depth map 307 based on a point cloud obtained through the LiDAR (e.g., the LiDAR 120 in FIG. 1) and an image obtained through the camera. For example, the second dense depth map 307 may be referred to as the second dense depth map 243 of FIG. 2.

In an embodiment, the processor may compare a depth map obtained through performing the depth prediction 305 with the second dense depth map 307. The processor may output a loss function based on comparing the depth map obtained through performing the depth prediction 305 with the second dense depth map 307. For example, the loss function may include a function for indicating a difference between a depth map obtained through performing the depth prediction 305 and the second dense depth map 307.

As mentioned above, the processor of the vehicle control apparatus according to an embodiment may train the MDE network 303 by using the second dense depth map 307. The processor may accurately identify and output the distance between the vehicle and the external object by using the RGB image 301 by training the MDE network 303 by using the second dense depth map 307.

Figure 4:
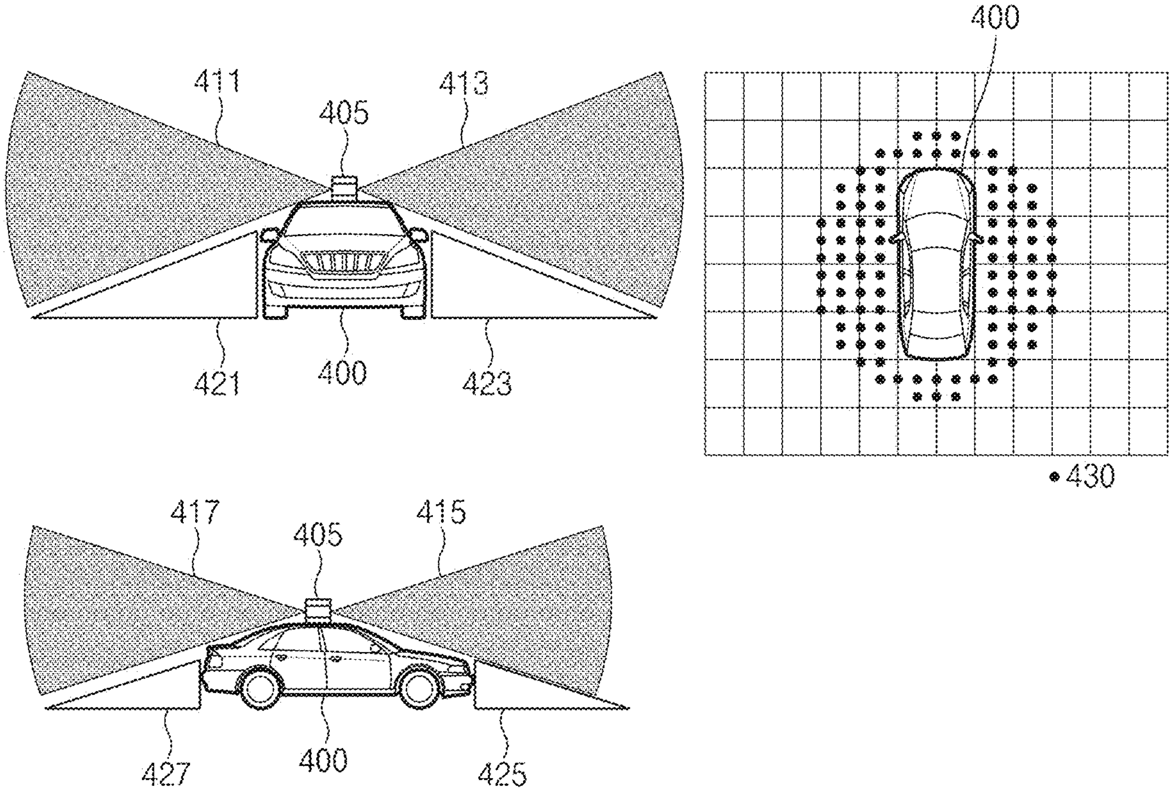
FIG. 4 shows an example of creating virtual points, in an embodiment of the present disclosure.

FIG. 4 shows an example of creating virtual points, in an embodiment of the present disclosure.

Referring to FIG. 4, a vehicle control apparatus (e.g., the vehicle control apparatus 100 of FIG. 1) according to an embodiment may be included in a vehicle 400. For example, the vehicle 400 may include a LiDAR 405.

In FIG. 4, at least one of a first area 411, a second area 413, a third area 415, or a fourth area 417, or any combination thereof may include an area where an external object is capable of being identified by the LiDAR 405. For example, if there is an external object in at least one of the first area 411, the second area 413, the third area 415, or the fourth area 417, or any combination thereof, a processor (e.g., the processor 110 in FIG. 1) may identify the external object through the LiDAR 405.

In FIG. 4, at least one of a first blind spot 421, a second blind spot 423, a third blind spot 435, and/or a fourth blind spot 427, may be an area where the external object is not identifiable by the LiDAR 405 (e.g., outside of the LiDAR's 405 range). In other words, the LiDAR 405 may be incapable of rendering the blind spots 421, 423, 438, 427. For example, if there is an external object in at least one of the first blind spot 421, the second blind spot 423, the third blind spot 435, or the fourth blind spot 427, or any combination thereof, the processor may not be able to identify the external object through the LiDAR 405.

Accordingly, because the processor is incapable of obtaining a point cloud associated with the ground identified in at least one of the first blind spot 421, the second blind spot 423, the third blind spot 435, or the fourth blind spot 427, or any combination thereof, the processor may generate virtual points 430 corresponding to the ground that is present in at least one of the first blind spot 421, the second blind spot 423, the third blind spot 435, or the fourth blind spot 427, or any combination thereof.

For example, the virtual points 430 may be created by the processor, and the processor may obtain a point cloud based on the generated virtual points 430. For example, the point cloud obtained based on the virtual points 430 may be referred to as the "short-range ground point cloud 221" in FIG. 2.

Figure 5:
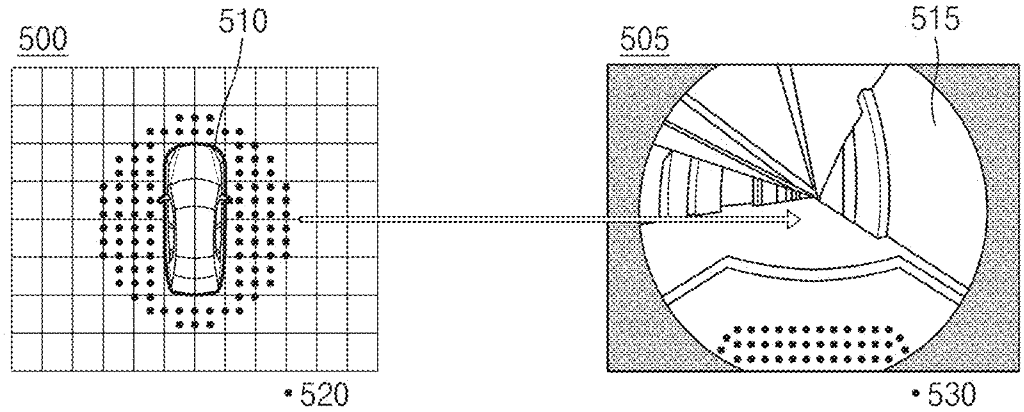
FIG. 5 shows an example of projecting created virtual points onto an image, in an embodiment of the present disclosure.

FIG. 5 shows an example of projecting created virtual points onto an image, in an embodiment of the present disclosure.

Referring to FIG. 5, in a first example 500, a processor (e.g., the processor 110 in FIG. 1) of a vehicle control apparatus (e.g., the vehicle control apparatus 100 in FIG. 1) according to an embodiment may generate virtual points 520 corresponding to the ground included in a blind spot of a LiDAR (e.g., the LiDAR 120 in FIG. 1, and/or the LiDAR 405 in FIG. 4) included in a host vehicle 510.

In a second example 505, the processor of the vehicle control apparatus according to an embodiment may project virtual points 530 as an image 515.

For example, the processor may convert the virtual points 520 expressed in a vehicle coordinate system and/or a point cloud formed by the virtual points 520 into points expressed in an image coordinate system.

For example, the processor may convert the virtual points 520 expressed in the vehicle coordinate system to the virtual points 530 expressed in the image coordinate system, based on equations below.

$$\begin{bmatrix} X_C \\ Y_C \\ Z_C \end{bmatrix} = \begin{bmatrix} R_{11}^{V\to C} & R_{12}^{V\to C} & R_{13}^{V\to C} \\ R_{21}^{V\to C} & R_{22}^{V\to C} & R_{23}^{V\to C} \\ R_{31}^{V\to C} & R_{32}^{V\to C} & R_{33}^{V\to C} \end{bmatrix} \begin{bmatrix} X_V \\ Y_V \\ Z_L = 0 \end{bmatrix} + \begin{bmatrix} T_1^{V\to C} \\ T_2^{V\to C} \\ T_3^{V\to C} \end{bmatrix} \quad \text{[Equation 1]}$$

$$\begin{bmatrix} X_C \\ Y_C \\ Z_C \end{bmatrix} = \begin{bmatrix} R_{11}^{V\to C} & R_{12}^{V\to C} & R_{13}^{V\to C} \\ R_{21}^{V\to C} & R_{22}^{V\to C} & R_{23}^{V\to C} \\ R_{31}^{V\to C} & R_{32}^{V\to C} & R_{33}^{V\to C} \end{bmatrix} \begin{bmatrix} X_V \\ Y_V \\ Z_L = 0 \end{bmatrix} + \begin{bmatrix} T_1^{V\to C} \\ T_2^{V\to C} \\ T_3^{V\to C} \end{bmatrix} \quad \text{[Equation 2]}$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} X_{norm} \\ Y_{norm} \\ 1 \end{bmatrix} \quad \text{[Equation 3]}$$

In Equation 1, $$R_{kl}^{V\to C}$$

may denote rotating a vehicle coordinate system. For example, in $$R_{kl}^{V\to C},$$

'k' may denote a row, and 'l' may denote a column. In Equation 1, $$T_m^{V\to C}$$

may mean moving the vehicle coordinate system. In $$T_m^{V\to C},$$

'm' may denote a row.

In Equation 2, $Z_c$ may include a value of a z-axis of a plurality of surfaces split around a reference axis of a vehicle including the camera. In Equation 2, $$\begin{bmatrix} X_c \\ Y_c \\ Z_c \end{bmatrix}$$

may be obtained based on Equation 1. For example, the reference axis of the vehicle may include an axis perpendicular to the ground, based on a designated location of the vehicle. For example, the designated location of the vehicle may include a center point of a front bumper of the vehicle.

In an embodiment, the processor may obtain a matrix based on at least one of a focal length of the camera, a skew coefficient of the camera, or a main point of an image, or any combination thereof.

For example, in Equation 3, $f_x$ and/or $f_y$ may be associated with the focal length of the camera. For example, $f_x$ and/or $f_y$ may be obtained based on the focal length of the camera and/or a size ratio of the image sensor included in the camera.

For example, $f_x$ may be obtained based on the focal length of the camera and a size ratio of an image sensor in a horizontal direction. For example, $f_y$ may be obtained based on the focal length of the camera and a size ratio of an image sensor in a vertical direction.

For example, as $f_x$ and/or $f_y$ increases, a field of view (FOV) may decrease. As $f_x$ and/or $f_y$ decreases, the FOV may increase.

For example, in Equation 3, $c_x$ and/or $c_y$ may be associated with the main point of the image. For example, $c_x$ and/or $c_y$ may include values used to generate an actual image by capturing a specific part of the formed entire image.

For example, $c_x$ may include a value of an x-axis direction (i.e., the horizontal direction) used to obtain the actual image from the entire image. $c_y$ may include a value of a y-axis direction (i.e., the vertical direction) used to obtain the actual image from the entire image.

As mentioned above, the processor of the vehicle control apparatus according to an embodiment may convert a point cloud expressed in a vehicle coordinate system into points expressed in an image coordinate system based on Equations 1 to 3.

In an embodiment, the processor may generate a sparse depth map based on a point cloud converted into points expressed in the image coordinate system and a point cloud generated by the LiDAR. For example, the processor may obtain a sparse depth map based on synthesizing the point cloud converted into points expressed in the image coordinate system and the point cloud generated by the LiDAR.

Figure 6:
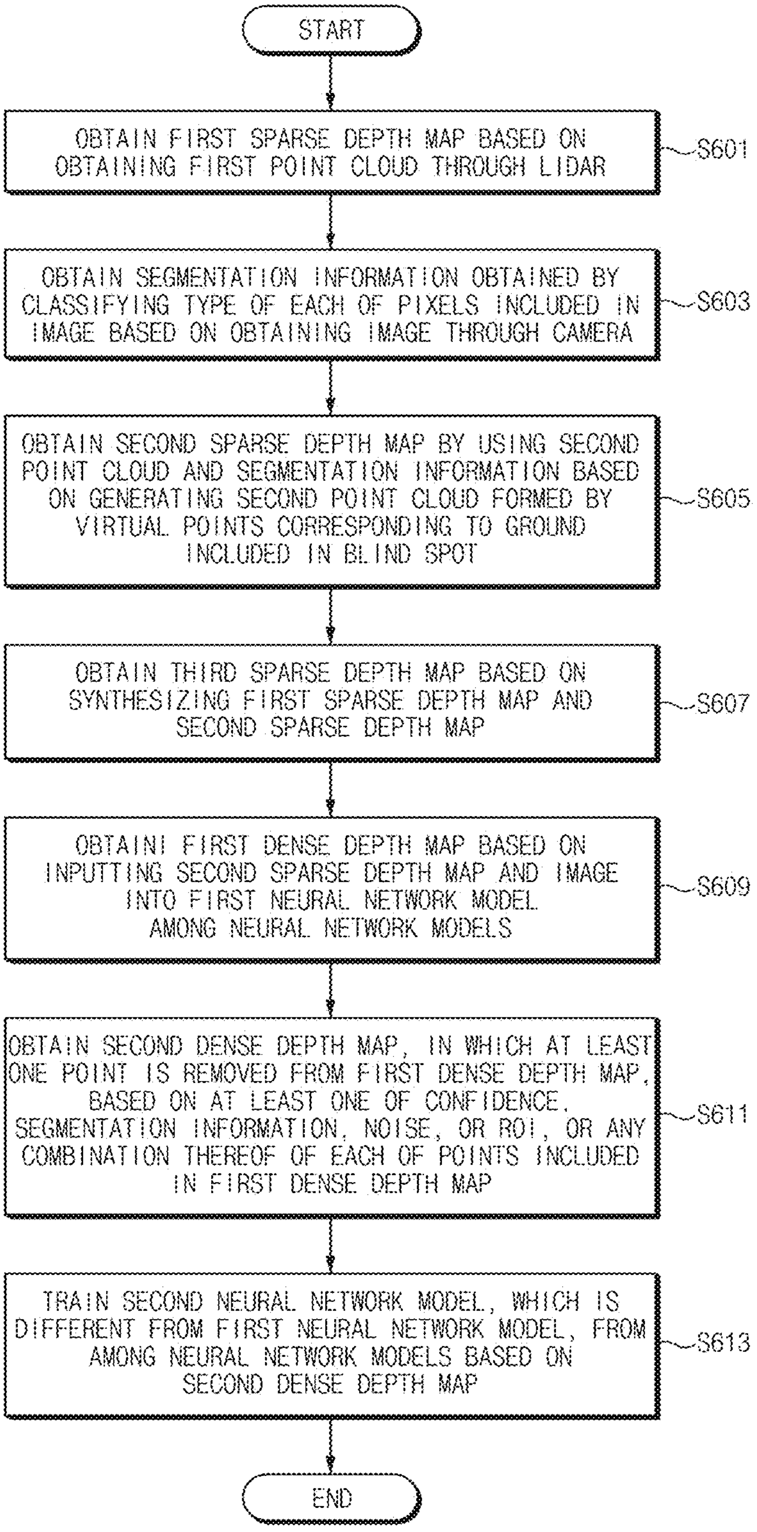
FIG. 6 shows an example of a flowchart associated with a vehicle control method, according to an embodiment of the present disclosure.

FIG. 6 shows an example of a flowchart associated with a vehicle control method, according to an embodiment of the present disclosure.

Hereinafter, it is assumed that the vehicle control apparatus 100 of FIG. 1 performs the process of FIG. 6. In addition, in a description of FIG. 6, it may be understood that an operation described as being performed by an apparatus is controlled by the processor 110 of the vehicle control apparatus 100.

At least one of operations of FIG. 6 may be performed by the vehicle control apparatus 100 of FIG. 1. At least one of operations of FIG. 6 may be performed by the processor 110 of FIG. 1. Each of the operations in FIG. 6 may be performed sequentially, but is not necessarily sequentially performed. For example, the order of operations may be changed, and at least two operations may be performed in parallel.

Referring to FIG. 6, in S601, a vehicle control method according to an embodiment may include an operation of obtaining a first sparse depth map based on obtaining a first point cloud through a LiDAR.

For example, the vehicle control method may further include an operation of obtaining the first sparse depth map based on converting the first point cloud expressed in a LiDAR coordinate system based on a location of the LiDAR into points expressed in a camera coordinate system based on a location of the camera.

In S603, the vehicle control method according to an embodiment may include an operation of obtaining segmentation information, which is obtained by classifying the type of each of pixels included in an image, based on obtaining the image through a camera.

In S605, the vehicle control method according to an embodiment may include an operation of obtaining a second sparse depth map by using the second point cloud and the segmentation information based on generating the second point cloud formed by the virtual points corresponding to the ground included in a blind spot.

For example, the blind spot may include an area of the ground incapable of being expressed by the LiDAR.

For example, the vehicle control method may include an operation of generating the virtual points with respect to the area of the ground incapable of being expressed by the LiDAR. For example, the vehicle control method may include an operation of generating a second point cloud based on generating virtual points with respect to the area of the ground incapable of being expressed by the LiDAR.

For example, the vehicle control method may include an operation of obtaining the second sparse depth map based on converting the second point cloud based on a vehicle coordinate system formed based on a vehicle into points expressed in a camera coordinate system based on a location of the camera.

In S607, the vehicle control method may include an operation of obtaining a third sparse depth map based on synthesizing the first sparse depth map and the second sparse depth map.

For example, the vehicle control method may include an operation of identifying a plurality of first points included in the first sparse depth map. For example, the vehicle control method may include an operation of identifying a plurality of second points included in the second sparse depth map.

For example, the vehicle control method may include an operation of selecting at least part of the plurality of first points, which overlap at least part of the plurality of second points, from among the plurality of first points as a first set.

For example, the vehicle control method may include an operation of selecting a plurality of second points that do not overlap with a plurality of first points as the second set.

For example, the vehicle control method may include an operation of obtaining a third sparse depth map based on the first set and the second set.

In S609, the vehicle control method according to an embodiment may include an operation of obtaining a first dense depth map based on inputting the second sparse depth map and the image into the first neural network model among the neural network models.

In S611, the vehicle control method according to an embodiment may include an operation of obtaining a second dense depth map, in which at least one point is removed from the first dense depth map, based on at least one of the confidence, the segmentation information, noise, or the ROI, or any combination thereof of each of the points included in the first dense depth map.

For example, the vehicle control method may include an operation of identifying the confidence of each of points included in the first dense depth map. The vehicle control method may include an operation of obtaining the second dense depth map based on removing a point, of which the confidence is less than reference confidence, from among the points included in the first dense depth map from the first dense depth map.

For example, the vehicle control method may include an operation of identifying at least one pixel with a designated type among a plurality of types based on the segmentation information in the first dense depth map. The vehicle control method may include an operation of obtaining the second dense depth map based on removing at least one point corresponding to at least one pixel with the designated type from the first dense depth map.

For example, the vehicle control method may include an operation of removing noise from the first dense depth map. The vehicle control method may include an operation of obtaining the second dense depth map based on selecting the ROI in the first dense depth map from which the noise is removed.

In S613, the vehicle control method may include an operation of training a second neural network model, which is different from the first neural network model, from among the neural network models based on the second dense depth map.

For example, the vehicle control method may include an operation of performing supervised learning using the second dense depth map as GT. For example, the vehicle control method may include an operation of training the second neural network model based on the supervised learning that uses the second dense depth map as GT.

For example, the first neural network model may use the image and a third sparse depth map as inputs. For example, the second neural network model may include an operation of outputting a depth map indicating the distance between objects displayed in the image and the vehicle including the camera, by using the image as an input. Based on the second neural network model, a vehicle (e.g., a vehicle on which the LiDAR and/or the camera is mounted) may be controlled (e.g., accelerated, decelerated, steered, braked, etc.).

Figure 7:
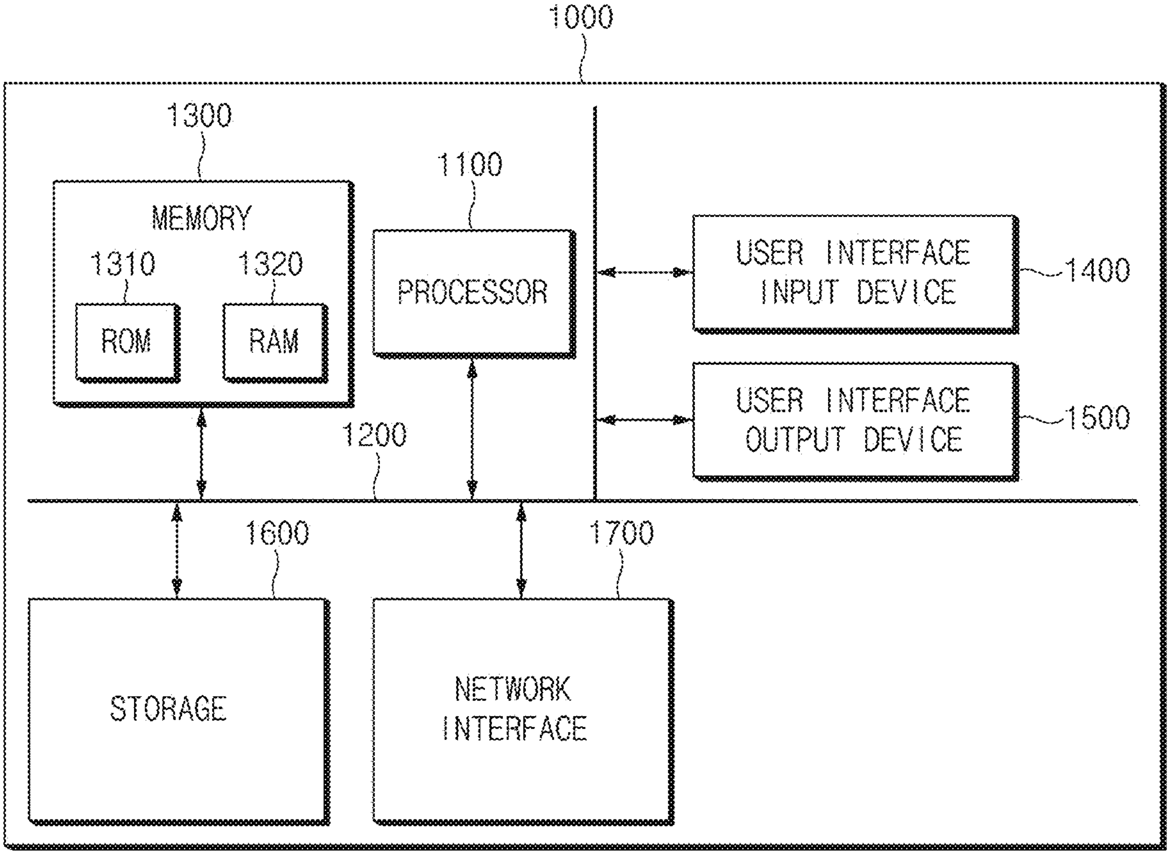
FIG. 7 shows a computing system associated with a vehicle control apparatus or vehicle control method, according to an embodiment of the present disclosure.

FIG. 7 shows a computing system associated with a vehicle control apparatus or vehicle control method, according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an aspect of the present disclosure, a vehicle control apparatus may include a memory in which neural network models are stored, a light detection and ranging (LiDAR), a camera, and a processor. The processor may obtain a first sparse depth map based on obtaining a first point cloud through the LiDAR, may obtain segmentation information obtained by classifying a type of each of pixels included in an image based on obtaining the image through the camera, may obtain a second sparse depth map by using a second point cloud and the segmentation information based on generating the second point cloud formed by virtual points corresponding to a ground included in a blind spot, may obtain a third sparse depth map based on synthesizing the first sparse depth map and the second sparse depth map, may obtain a first the dense depth map based on inputting the third sparse depth map and the image into a first neural network model among the neural network models, may obtain a second dense depth map, in which at least one point is removed from the first dense depth map, based on at least one of confidence, segmentation information, noise, or region of interest (ROI), or any combination thereof of each of points included in the first dense depth map, and may train a second neural network model, which is different from the first neural network model, from among the neural network models based on the second dense depth map.

In an embodiment, the processor may obtain the first sparse depth map based on converting the first point cloud expressed in a LiDAR coordinate system based on a location of the LiDAR into points expressed in a camera coordinate system based on a location of the camera.

In an embodiment, the processor may obtain the second sparse depth map based on converting the second point cloud based on a vehicle coordinate system formed based on a vehicle into points expressed in a camera coordinate system based on a location of the camera.

In an embodiment, the processor may identify the confidence of each of the points included in the first dense depth map, and may obtain the second dense depth map based on removing a point, of which the confidence is less than reference confidence, from among the points included in the first dense depth map from the first dense depth map.

In an embodiment, the processor may identify at least one pixel with a designated type among a plurality of types based on the segmentation information in the first dense depth map, and may obtain the second dense depth map based on removing at least one point corresponding to at least one pixel with the designated type from the first dense depth map.

In an embodiment, the processor may remove the noise from the first dense depth map, and may obtain the second dense depth map based on selecting the ROI in the first dense depth map from which the noise is removed.

In an embodiment, the blind spot may include an area, which is incapable of being expressed by the LiDAR, in the ground. The processor may generate the virtual points with respect to the area incapable of being expressed.

In an embodiment, the processor may identify a plurality of first points included in the first sparse depth map, may identify a plurality of second points included in the second sparse depth map, may select at least part of the plurality of first points, which overlap at least part of the plurality of second points, from among the plurality of first points as a first set, may select a plurality of second points, which do not overlap the plurality of first points, as a second set, and may obtain the third sparse depth map based on the first set and the second set.

In an embodiment, the processor may train the second neural network model based on supervised learning using the second dense depth map as ground truth (GT).

In an embodiment, the first neural network model may use the image and the third sparse depth map as inputs. The second neural network model may output a depth map indicating a distance between objects expressed in the image and a vehicle including the camera, by using the image as an input.

According to an aspect of the present disclosure, a vehicle control method may include obtaining, by a processor, a first sparse depth map based on obtaining a first point cloud through a LiDAR, obtaining segmentation information obtained by classifying a type of each of pixels included in an image based on obtaining the image through a camera, obtaining a second sparse depth map by using a second point cloud and the segmentation information based on generating the second point cloud formed by virtual points corresponding to a ground included in a blind spot, obtaining a third sparse depth map based on synthesizing the first sparse depth map and the second sparse depth map, obtaining a first the dense depth map based on inputting the third sparse depth map and the image into a first neural network model among neural network models, obtaining a second dense depth map, in which at least one point is removed from the first dense depth map, based on at least one of confidence, segmentation information, noise, or ROI, or any combination thereof of each of points included in the first dense depth map, and training a second neural network model, which is different from the first neural network model, from among the neural network models based on the second dense depth map.

According to an embodiment, the vehicle control method may further include obtaining the first sparse depth map based on converting the first point cloud expressed in a LiDAR coordinate system based on a location of the LiDAR into points expressed in a camera coordinate system based on a location of the camera.

According to an embodiment, the vehicle control method may further include obtaining the second sparse depth map based on converting the second point cloud based on a vehicle coordinate system formed based on a vehicle into points expressed in a camera coordinate system based on a location of the camera.

According to an embodiment, the vehicle control method may further include identifying the confidence of each of the points included in the first dense depth map, and obtaining the second dense depth map based on removing a point, of which the confidence is less than reference confidence, from among the points included in the first dense depth map from the first dense depth map.

According to an embodiment, the vehicle control method may further include identifying at least one pixel with a designated type among a plurality of types based on the segmentation information in the first dense depth map, and obtaining the second dense depth map based on removing at least one point corresponding to at least one pixel with the designated type from the first dense depth map.

According to an embodiment, the vehicle control method may further include removing the noise from the first dense depth map, and obtaining the second dense depth map based on selecting the ROI in the first dense depth map from which the noise is removed.

In an embodiment, the blind spot may include an area, which is incapable of being expressed by the LiDAR, in the ground. The vehicle control method may further include generating the virtual points with respect to the area incapable of being expressed.

According to an embodiment, the vehicle control method may further include identifying a plurality of first points included in the first sparse depth map, identifying a plurality of second points included in the second sparse depth map, selecting at least part of the plurality of first points, which overlap at least part of the plurality of second points, from among the plurality of first points as a first set, selecting a plurality of second points, which do not overlap the plurality of first points, as a second set, and obtaining the third sparse depth map based on the first set and the second set.

According to an embodiment, the vehicle control method may further include training the second neural network model based on supervised learning using the second dense depth map as GT.

In an embodiment, the first neural network model may use the image and the third sparse depth map as inputs. The second neural network model may output a depth map indicating a distance between objects expressed in the image and a vehicle including the camera, by using the image as an input.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

The present technology may improve training and/or inference of a neural network model (e.g., a MDE network).

The present technology may accurately predict a distance between a vehicle and an external object by using an image obtained through a camera, by creating virtual points in blind spots of a LiDAR and training a neural network model by using a point cloud by the created virtual points.

The present technology may obtain a dense depth map for effectively training the neural network model.

Besides, a variety of effects directly or indirectly understood through the present disclosure may be provided.

Hereinabove, although the present disclosure was described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control apparatus comprising:
a memory in which neural network models are stored;
a light detection and ranging (LiDAR) device;
a camera; and
a processor,
wherein the processor is configured to:
obtain, via the LiDAR device, a first point cloud;
generate, based on the first point cloud, a first sparse depth map;
obtain, via the camera, an image;
generate segmentation information by classifying a type of at least one pixel included in the image;
generate a second point cloud by forming virtual points corresponding to a ground included in a blind spot of the LiDAR;
generate, based on the second point cloud and the segmentation information, a second sparse depth map;
generate, based on synthesizing the first sparse depth map and the second sparse depth map, a third sparse depth map;
generate a first dense depth map based on inputting the third sparse depth map and the image into a first neural network model among the neural network models;
generate a second dense depth map by removing at least one point from the first dense depth map, based on at least one of a confidence level, segmentation information, a noise, or a region of interest (ROI) of at least one point included in the first dense depth map;
train, based on the second dense depth map, a second neural network model, which is different from the first neural network model, from among the neural network models; and
control a vehicle based on the second dense depth map.

2. The vehicle control apparatus of claim 1, wherein the processor is configured to generate the first sparse depth map by:
converting the first point cloud, which is expressed in a LiDAR device coordinate system based on a location of the LiDAR device, into points expressed in a camera coordinate system based on a location of the camera.

3. The vehicle control apparatus of claim 1, wherein the processor is configured to generate the second sparse depth map by:
converting the second point cloud, which is expressed in a vehicle coordinate system for the vehicle, into points expressed in a camera coordinate system based on a location of the camera.

4. The vehicle control apparatus of claim 1, wherein the processor is configured to generate the second dense depth map by:
determining the confidence level of at least one point included in the first dense depth map; and
removing, from the first dense depth map, a point, of which the confidence level is less than a threshold value, from among points included in the first dense depth map.

5. The vehicle control apparatus of claim 1, wherein the processor is configured to generate the second dense depth map by:
determining, in the first dense depth map, at least one pixel associated with a designated type among a plurality of types based on the segmentation information; and
removing, from the first dense depth map, at least one point corresponding to the at least one pixel associated with the designated type.

6. The vehicle control apparatus of claim 1, wherein the processor is configured to generate the second dense depth map by:
removing the noise from the first dense depth map; and
selecting the ROI, from which the noise is removed, in the first dense depth map.

7. The vehicle control apparatus of claim 1, wherein the blind spot comprises an area, which the LiDAR device is incapable of rendering, in the ground, and
wherein the processor is further configured to:
generate the virtual points associated with the area.

8. The vehicle control apparatus of claim 1, wherein the processor is configured to generate the third sparse depth map by:
determining a plurality of first points included in the first sparse depth map;

determining a plurality of second points included in the second sparse depth map;

selecting at least part of the plurality of first points, which overlap at least part of the plurality of second points, as a first set;

selecting a remaining part of the plurality of second points, which do not overlap the first set, as a second set; and generating the third sparse depth map further based on the first set and the second set.

9. The vehicle control apparatus of claim 1, wherein the processor is configured to train the second neural network model by:

training the second neural network model further based on supervised learning using the second dense depth map as ground truth (GT).

10. The vehicle control apparatus of claim 1, wherein the first neural network model uses, as inputs, the image and the third sparse depth map, and wherein the second neural network model outputs, using the image as an input, a depth map indicating a distance between objects, included in the image, and the vehicle.

11. A method comprising:

generating, by a processor, a first sparse depth map based on a first point cloud obtained through a LiDAR device;

generating segmentation information by classifying a type of at least one pixel included in an image obtained via a camera;

generating a second point cloud by forming virtual points corresponding to a ground included in a blind spot of the LiDAR device;

generating, based on the second point cloud and the segmentation information, a second sparse depth map;

generating, based on synthesizing the first sparse depth map and the second sparse depth map, a third sparse depth map;

generating a first dense depth map based on inputting the third sparse depth map and the image into a first neural network model among neural network models;

generating a second dense depth map by removing at least one point from the first dense depth map, based on at least one of a confidence level, segmentation information, a noise, or a region of interest (ROI) of at least one point included in the first dense depth map;

training, based on the second dense depth map, a second neural network model, which is different from the first neural network model, from among the neural network models; and controlling a vehicle based on the second dense depth map.

12. The method of claim 11, further comprising:

converting the first point cloud, which is expressed in a LiDAR device coordinate system based on a location of the LiDAR device, into points expressed in a camera coordinate system based on a location of the camera.

13. The method of claim 11, further comprising:

converting the second point cloud, which is expressed in a vehicle coordinate system for the vehicle, into points expressed in a camera coordinate system based on a location of the camera.

14. The method of claim 11, further comprising:

determining the confidence level of at least one point included in the first dense depth map; and removing, from the first dense depth map, a point, of which the confidence level is less than a threshold value, from among points included in the first dense depth map.

15. The method of claim 11, further comprising:

determining, in the first dense depth map, at least one pixel associated with a designated type among a plurality of types based on the segmentation information; and removing, from the first dense depth map, at least one point corresponding to the at least one pixel associated with the designated type.

16. The method of claim 11, further comprising:

removing the noise from the first dense depth map; and selecting the ROI, from which the noise is removed, in the first dense depth map.

17. The method of claim 11, wherein the blind spot comprises an area, which the LiDAR device is incapable of rendering, in the ground, and wherein the method further comprises:

generating the virtual points associated with the area.

18. The method of claim 11, further comprising:

determining a plurality of first points included in the first sparse depth map;

determining a plurality of second points included in the second sparse depth map;

selecting at least part of the plurality of first points, which overlap at least part of the plurality of second points, as a first set; and selecting a remaining part of the plurality of second points, which do not overlap the first set, as a second set, wherein the generating of the third sparse depth map is further based on the first set and the second set.

19. The method of claim 11, wherein the training of the second neural network model is further based on supervised learning using the second dense depth map as GT.

20. The method of claim 11, wherein the first neural network model uses, as inputs, the image and the third sparse depth map, and wherein the second neural network model outputs, using the image as an input, a depth map indicating a distance between objects, included in the image, and the vehicle.

* * * * *